July 22, 1941.  J. V. CLOUTIER  2,250,220

HYDRAULIC BRAKE HOLDING MECHANISM

Filed Jan. 21, 1941

Inventor

Joseph Victor Cloutier

By Clarence A. O'Brien

Attorney

Patented July 22, 1941

2,250,220

UNITED STATES PATENT OFFICE 2,250,220

HYDRAULIC BRAKE HOLDING MECHANISM

Joseph Victor Cloutier, Berlin, N. H.

Application January 21, 1941, Serial No. 375,331

1 Claim. (Cl. 251—132)

This invention relates to new and useful improvements in hydraulic brake systems and more particularly to a mechanism for holding brakes in applied position without constant application of human effort.

An important object of the invention is to provide a fluid holding mechanism for hydraulic brakes which will serve to hold the fluid in the system against immediate return to the master cylinder to the end that brakes will be held applied until such time as the operator wishes to release the same.

Other objects and advantages of the invention will become apparent to the reader of the following specification.

Figure 1:
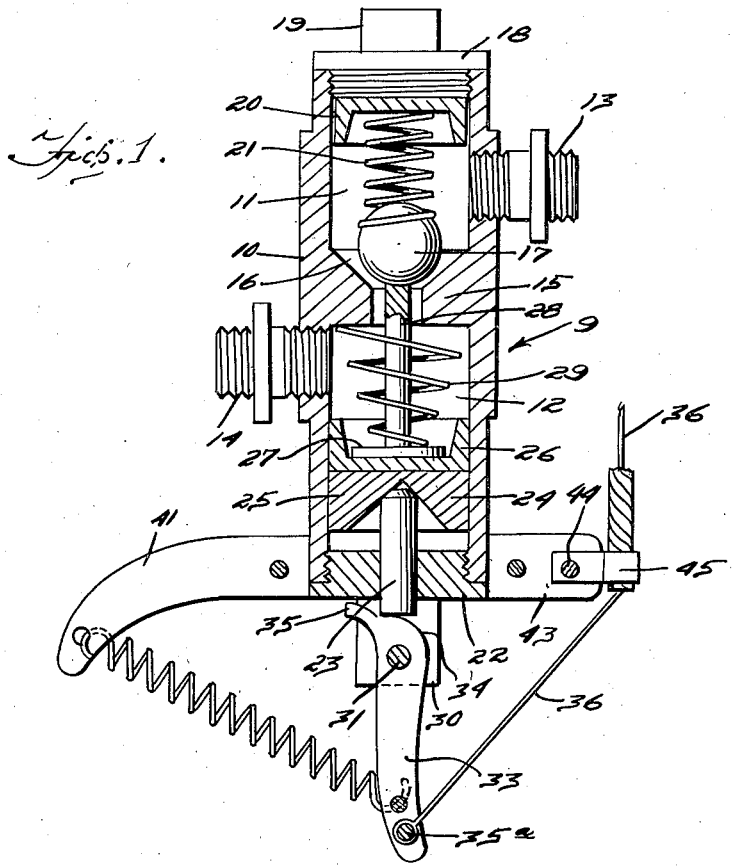
Figure 1 is a vertical sectional view through the mechanism.
Figure 2:
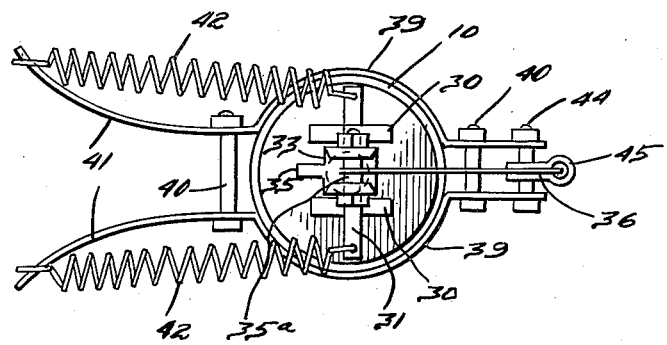
Figure 2 is a bottom plan view of the mechanism the nipples being omitted.

Referring to the drawing wherein like numerals designate like parts, it may first be explained that the holding mechanism of my invention is designed to be interposed between the usual master cylinder and various brake lines of the hydraulic brake system of an automobile, but, since such systems are well understood in the art, it has not been deemed essential to a proper understanding of the invention to illustrate the brake system.

This holding mechanism consists of a vertically disposed shell 10 having an upper chamber 11 and a lower chamber 12. A nipple 13 extends from the upper chamber 11 and is adapted to be connected by a suitable conduit with the brake lines.

Extending from the lower chamber 12 is a nipple 14 adapted to be suitably connected with the master cylinder.

At the intermediate portion of the interior of the shell 10 is a constricted formation 15 constructed to define a seat 16 for a valve or ball 17.

A plug 18 is threadedly disposed into the upper portion of the shell 10 and has a wrench engageable formation 19 at the top thereof. This plug 18 bears against a cup 20 which receives the upper portion of a compression spring 21, the lower end of which impinges against the ball 17 in its tendency to urge the ball downwardly.

A threaded plug 22 is provided in the lower portion of the shell 10 and has a pin 23 slidable therethrough with its upper beveled end seated in a conical recess 24 of a follower 25 operative in the lower portion of the shell 10. Above this follower 25 and moved by the follower 25 is a cup 26 receiving a plate 27 from which rises a stem 28, the upper end of which is concaved to conform with the curvature of the ball 17. A coiled compression spring 29 is interposed between the top of the chamber 12 and the plate 27 for normally tending to move the stem 28 downwardly so that the ball 17 can be seated by the spring 21.

Depending from the lower threaded plug 22 are ears 30, 30 through which a shaft 31 extends and rotatable on this shaft 31 is a cam lever 33, the cam portion 34 of which is adapted to ride the lower end of the pin 23. A finger 35 on the cam end of the lever 33 prevents overriding of the pin 33.

It is preferable that the lever or arm portion of the cam lever 33 be bifurcated and a cross pin 35a is provided between the furcations and to this cross pin 35a is connected a control wire 36 which extends through a flexible conduit 37 to a button or the like 38 adjacent the driver's seat not shown.

A pair of arcuate-shaped members 39 are secured to opposite sides of the lower portion of the shell 10 by bolts 40 and these arcuate members 39 have a pair of outwardly flaring or diverged arms 41 between which and the lever 33 tension springs 42 are located to normally tend to hold the lever 33 in a position cammed against the pin 23 to maintain the ball 17 unseated for free flow of the braking fluid through the mechanism 9. The arcuate members 39 are provided with lug extensions 43 which have a cross member 44 supporting a clamp 45 for the adjacent end of the flexible conduit 37.

Should the driver desire to set the mechanism so that it will take effect on the next application of the brakes, he simply pulls on the button or knob 38, moving the lever 33 to an uncamming position. The ball 17 will then become seated. When the brakes are applied forcing fluid from the left to the right through the mechanism 9, the ball 17 will serve as a check valve to prevent return of the braking fluid and thus the brakes will be held until such time as the button 38 is released and the springs 42 permitted to return the cam to a camming position, lifting the ball 17.

While the foregoing specification sets forth the invention in specific terms, it is to be understood that numerous changes in shape, size and materials may be resorted to without departing from the spirit and scope of the invention as claimed hereinafter.

Having described the invention, what is claimed as new is:

A holding device for use in a fluid brake line comprising a shell having upper and lower closed ends, an intermediate internal flange dividing the shell into a pair of upper and lower outlet and inlet chambers, respectively, and forming a valve seat between said chambers, inlet and outlet nipples extending out of said chambers, respectively, a ball valve spring biased to normally engage said seat, and means to normally hold said valve elevated off the seat and operative to lower the valve at will comprising a vertically movable ball supporting pin in said lower chamber movable downwardly to lower said ball into seated position, pin supporting means in the lower chamber comprising a vertically movable follower adapted to be lowered under the pressure exerted against said pin, a follower supporting pin vertically slidable at the lower end of the shell and adapted to be lowered to permit lowering of the follower, a lever pivotally mounted on the lower end of the shell in pendant position and having a cam end holding said follower supporting pin elevated, said lever being swingable in one direction from a normal position to permit lowering of the follower supporting pin, a pull cable for swinging said lever in said one direction, spring means tensioning the lever against movement in said one direction, and a stop on said lever engaging the follower lowering pin to establish the normal position of the lever under the urge of said spring means.

JOSEPH VICTOR CLOUTIER.